United States Patent
Gamage et al.

(10) Patent No.: US 12,519,712 B2
(45) Date of Patent: Jan. 6, 2026

(54) FLEXIBLE AND SCALABLE AUTOMATIC NEXT-HOP RESOLUTION IN TRAFFIC ENGINEERING NETWORKS

(71) Applicant: Ciena Corporation, Hanover, MD (US)

(72) Inventors: Amila Pradeep Kumara Tharaperiya Gamage, Stittsville (CA); Muthurajah Sivabalan, Kanata (CA)

(73) Assignee: Ciena Corporation, Hanover, MD (US)

( * ) Notice: Subject to any disclaimer, the term of this patent is extended or adjusted under 35 U.S.C. 154(b) by 18 days.

(21) Appl. No.: 18/594,797

(22) Filed: Mar. 4, 2024

(65) Prior Publication Data

US 2025/0279955 A1 Sep. 4, 2025

(51) Int. Cl.
*H04L 45/02* (2022.01)
*H04L 45/00* (2022.01)

(52) U.S. Cl.
CPC .............. *H04L 45/04* (2013.01); *H04L 45/34* (2013.01)

(58) Field of Classification Search
CPC ............................... H04L 45/04; H04L 45/34
See application file for complete search history.

(56) References Cited

U.S. PATENT DOCUMENTS

| | | | |
|---|---|---|---|
| 7,031,262 B2 | 4/2006 | Vasseur et al. | |
| 7,345,994 B2 | 3/2008 | Sivabalan et al. | |
| 7,359,386 B2 | 4/2008 | Vasseur et al. | |
| 7,599,349 B2 | 10/2009 | Vasseur et al. | |
| 7,626,925 B1 | 12/2009 | Sivabalan et al. | |
| 7,646,772 B2 | 1/2010 | Sivabalan et al. | |
| 7,684,351 B2 | 3/2010 | Vasseur et al. | |
| 7,801,048 B1 | 9/2010 | Sivabalan et al. | |
| 8,004,964 B2 | 8/2011 | Boutros et al. | |
| 8,131,873 B2 | 3/2012 | Vasseur et al. | |
| 8,320,255 B2 | 11/2012 | Vasseur et al. | |
| 8,572,225 B2 | 10/2013 | Scudder et al. | |
| 8,724,454 B2 | 5/2014 | Boutros et al. | |
| 8,976,682 B2 | 3/2015 | Boutros et al. | |
| 9,013,985 B2 | 4/2015 | Sivabalan et al. | |
| 9,313,145 B2 | 4/2016 | Gandhi et al. | |
| 9,419,885 B2 | 8/2016 | Boutros et al. | |
| 9,497,107 B1 | 11/2016 | Akiya et al. | |
| 9,537,753 B2 | 1/2017 | Alvarez et al. | |

(Continued)

OTHER PUBLICATIONS

Rosen et a., RFC 5512: The BGP Encasuplation Subsequent Address Family Identifier (SAFI) and the BGP Tunnel Encapsulation Attribute, 2009.*

(Continued)

*Primary Examiner* — Todd L Barker
(74) *Attorney, Agent, or Firm* — Baratta Law PLLC; Lawrence A. Baratta, Jr.

(57) ABSTRACT

Systems and methods for flexible and scalable Automatic Next-Hop Resolution (ANR) in Traffic Engineering (TE) networks, specifically with color-templates, include, responsive to a Customer Edge Router advertising a prefix with an associated color to a node in a Service Provider Network, receiving a request to generate one of a Segment Routing policy and a tunnel based on a color-template for the associated color; and providing the one of the Segment Routing policy and tunnel information for the tunnel to the node for installation thereon, wherein the node is one of a Provider Edge Router and a Border Router.

19 Claims, 4 Drawing Sheets

(56) References Cited

U.S. PATENT DOCUMENTS

| | | |
|---|---|---|
| 9,634,929 B2 | 4/2017 | Boutros et al. |
| 9,641,416 B2 | 5/2017 | Frost et al. |
| 9,699,087 B2 | 7/2017 | Boutros et al. |
| 9,722,916 B2 | 8/2017 | Sivabalan et al. |
| 9,979,629 B2 | 5/2018 | Sivabalan et al. |
| 10,063,463 B2 | 8/2018 | Saad et al. |
| 10,158,558 B1 | 12/2018 | Ward et al. |
| 10,165,093 B2 | 12/2018 | Filsfils et al. |
| 10,250,459 B2 | 4/2019 | Ali et al. |
| 10,250,494 B2 | 4/2019 | Sivabalan et al. |
| 10,833,976 B2 | 11/2020 | Saad et al. |
| 10,868,755 B2 | 12/2020 | Filsfils et al. |
| 10,892,967 B2 | 1/2021 | Filsfils et al. |
| 11,271,849 B1 * | 3/2022 | Darwish ............ H04L 12/4633 |
| 11,411,876 B2 | 8/2022 | Tharaperiya Gamage |
| 11,425,022 B1 * | 8/2022 | Singh ................ H04L 12/4633 |
| 11,483,230 B2 | 10/2022 | Filsfils et al. |
| 11,552,879 B1 | 1/2023 | Sivabalan et al. |
| 11,722,400 B2 | 8/2023 | Sivabalan et al. |
| 2015/0117222 A1 | 4/2015 | Saad et al. |
| 2016/0254994 A1 | 9/2016 | Bryant et al. |
| 2017/0026461 A1 | 1/2017 | Boutros et al. |
| 2017/0230274 A1 | 8/2017 | Filsfils et al. |
| 2018/0109450 A1 | 4/2018 | Filsfils et al. |
| 2019/0297017 A1 | 9/2019 | Pignataro et al. |
| 2019/0356600 A1 | 11/2019 | Barton et al. |
| 2020/0153856 A1 | 5/2020 | Nainar et al. |
| 2022/0086078 A1 | 3/2022 | Sivabalan et al. |
| 2022/0124019 A1 | 4/2022 | Boutros et al. |
| 2022/0200903 A1 | 6/2022 | Boutros et al. |
| 2022/0368638 A1 | 11/2022 | Gamage et al. |
| 2023/0067946 A1 | 3/2023 | Alaettinoglu et al. |
| 2023/0071325 A1 | 3/2023 | Boutros et al. |
| 2023/0073266 A1 | 3/2023 | Boutros et al. |
| 2023/0095297 A1 | 3/2023 | Alaettinoglu et al. |
| 2023/0146226 A1 | 5/2023 | Sivabalan et al. |
| 2023/0146374 A1 | 5/2023 | Sivabalan et al. |
| 2023/0171178 A1 | 6/2023 | Gamage et al. |
| 2023/0239176 A1 | 7/2023 | Boutros et al. |

OTHER PUBLICATIONS

Hegde et al., "RFC 7777L Advertising Node Administratvie Tags IN OSPF" 2016.*

Jalil et al., "RFC 9013: OPSF Advertisement of Tunnel Encapsulation", 2021.*

* cited by examiner

FLEXIBLE AND SCALABLE AUTOMATIC NEXT-HOP RESOLUTION IN TRAFFIC ENGINEERING NETWORKS

FIELD OF THE DISCLOSURE

The present disclosure relates generally to networking and computing. More particularly, the present disclosure relates to systems and methods for flexible and scalable Automatic Next-Hop Resolution (ANR) in Traffic Engineering (TE) networks.

BACKGROUND OF THE DISCLOSURE

Automatic Next-Hop Resolution (ANR) is a network feature designed to simplify and automate the process of determining the next-hop Internet Protocol (IP) address for a given destination, particularly in complex network scenarios such as those involving Virtual Private Networks (VPNs) or dynamically changing network topologies. This feature is particularly relevant in the context of Multiprotocol Label Switching (MPLS) networks and IP routing, where manual configuration of next-hop addresses for each possible destination can be cumbersome and prone to errors, especially in large-scale or rapidly evolving networks. ANR supports (1) scalability, reducing the administrative overhead associated with managing large or complex networks by automating the resolution of next-hop addresses; (2) flexibility, enhancing the network's ability to adapt to changes, such as route updates, topology changes, or network expansions, without the need for manual reconfiguration; and (3) efficiency, improving the overall efficiency of the routing process by ensuring that the most current and optimal next-hop routes are used, which can improve performance and reduce latency. ANR does not adhere to a single, specific standard but a concept that integrates with and relies on the broader standards and mechanisms of various routing and signaling protocols that facilitate dynamic routing and path determination in complex network architectures.

Segment Routing (SR) simplifies the forwarding of packets within a network by encoding the path that a packet takes through the network as a list of segments, which are instructions on how to forward the packet. Segment Routing is described, e.g., in RFC 8402, "Segment Routing Architecture," Internet Engineering Task Force (IETF), July 2018, the contents of which are incorporated herein by reference. Segment Routing inherently supports automatic next-hop determination within its architecture. Segment Routing Traffic Engineering (SR-TE) includes further extensions to support traffic engineering and advanced path selection. This concept also ties into the broader use in Software-Defined Networking (SDN) environments. In the context of SR-TE, a "color" is used as an abstract representation to match traffic flows to specific policies or paths through the network. These policies are defined by administrators to meet certain criteria like bandwidth, latency, or administrative preference. The concept of "color" allows for the simplification of traffic engineering policies by abstracting the details of the path characteristics into a color identifier. This identifier is then used to automatically resolve the next-hop or the specific path (list of segments) that the traffic should take to adhere to the defined policy.

ANR with color-templates allows the automatically determination of the appropriate next-hop or path for traffic based on the color-template associated with the color. This is facilitated by control-plane protocols and software-defined networking controllers that compute optimal paths based on the network's current state and the policies defined in color-templates by network administrators.

BRIEF SUMMARY OF THE DISCLOSURE

The present disclosure relates to systems and methods for flexible and scalable Automatic Next-Hop Resolution (ANR) in Traffic Engineering (TE) networks, specifically with color-templates. ANR with color-templates requires a significant amount of configuration at Provider Edges (PEs) and Border Routers (BRs). Moreover, whenever end customers change their networks, service providers may also have to make changes to the service provider network. This leads to less flexibility and higher operational costs. The proposed mechanisms herein overcome these shortcomings. Specifically, the proposed mechanisms allow associating colors to prefixes at Customer Edges (CE). This allows customers to make any change to their network and assign/re-assign color values to prefixes as they wish, without requiring any changes to the service provider network. The proposed mechanisms also allow maintaining color-templates only at a controller, letting PEs/BRs request the controller to generate SR policies on demand. This reduces required configurations and scales well.

In various embodiments, the present disclosure includes a method with steps, a controller or other processing device or service configured to implement the steps, and a non-transitory computer-readable medium storing instructions that, when executed, cause one or more processors to implement the steps. The steps include, responsive to a Customer Edge Router advertising a prefix with an associated color to a node in a Service Provider Network, receiving a request to generate one of a Segment Routing policy and a tunnel based on a color-template for the associated color; and providing the one of the Segment Routing policy and tunnel information for the tunnel to the node for installation thereon, wherein the node is one of a Provider Edge Router and a Border Router. The color-template can include parameters and constraints needed to provide the one of the Segment Routing policy and the tunnel information. The Customer Edge Router can advertise the prefix with the associated color with one of an Interior Gateway Protocol (IGP) and Border Gateway Protocol (BGP). The tunnel can be based on Resource Reservation Protocol-Traffic Engineering (RSVP-TE) tunnel.

The steps can further include, responsive to changing the prefix to another associated color at the Customer Edge Router and advertising to the node, receiving another request from the node to generate one of a Segment Routing policy and a tunnel based on another color-template for the another associated color. The request can be via a Type-Length-Value (TLV). The steps can further include, responsive to the color-template not being configured or having been previously deleted at a controller, using a default color-template. The steps can further include, responsive to the color-template being modified at a controller, pushing the modified one of the Segment Routing policy and the tunnel information to the node for installation thereon.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for flexible and scalable ANR in TE networks, specifically with color-templates. In particular, the present disclosure includes:

(1) Prefix to color association is maintained at CEs.

(2) A CE advertises prefixes with colors to any attached PE (i.e., egress-PE). Interior Gateway Protocol (IGP) (e.g., Intermediate System-Intermediate System (ISIS), Open Shortest Path First (OSPF), etc.) or Border Gateway Protocol (BGP) advertises prefixes (e.g., IPv4 and IPV6) with a color. BGP process at an egress-PE receives colors from prefixes received in Virtual Routing and Forwarding (VRF) via IGP or BGP. BGP advertises BGP updates (e.g., VPNv4, VPNv6, etc.) with the color received via IGP or BGP.

(3) Color-templates which include parameters and constraints required to instantiate SR policies are maintained at a controller (i.e., controller maintains color to intent mapping.)

(4) A node (e.g., an ingress-PE or a BR) which received a prefix (e.g., VPNv4) with a color requests a controller to generate a SR policy based on the color-template for the received color. The generated SR policy is then sent to the node for installation thereon. The request sent by the node to the controller may include a source address for the SR policy, a destination address for the SR policy, and the color.

Problem Statement

Network operators are looking for cost-effective and scalable ways to provide services to customers while customers are looking for cost-effectiveness as well as flexibility. Service automation is a key to provide services in a cost-effective and scalable manner to the customers. ANR automates provisioning transport for carrying services, such as Layer 3 Virtual Private Network (L3VPN) and Ethernet Virtual Private Network (EVPN), using SR policies. With ANR, an egress PE advertises a prefix with a color. This color identifies a set of constraints and parameters based on which SR policies are instantiated at ingress PEs and border nodes to provide end-to-end transport for the service.

ANR based services can be provisioned with or without using a controller. The present disclosure assumes use of a controller, which can include PCE functionality. Three of the key advantages of using a controller are: (1) multi-domain support; (2) ability to provide end-to-end disjoint active and backup paths for the services; and (3) SR policies need to be instantiated only at ingress PEs since controller can compute end-to-end paths from ingress-PE to egress PE.

Figure 1:
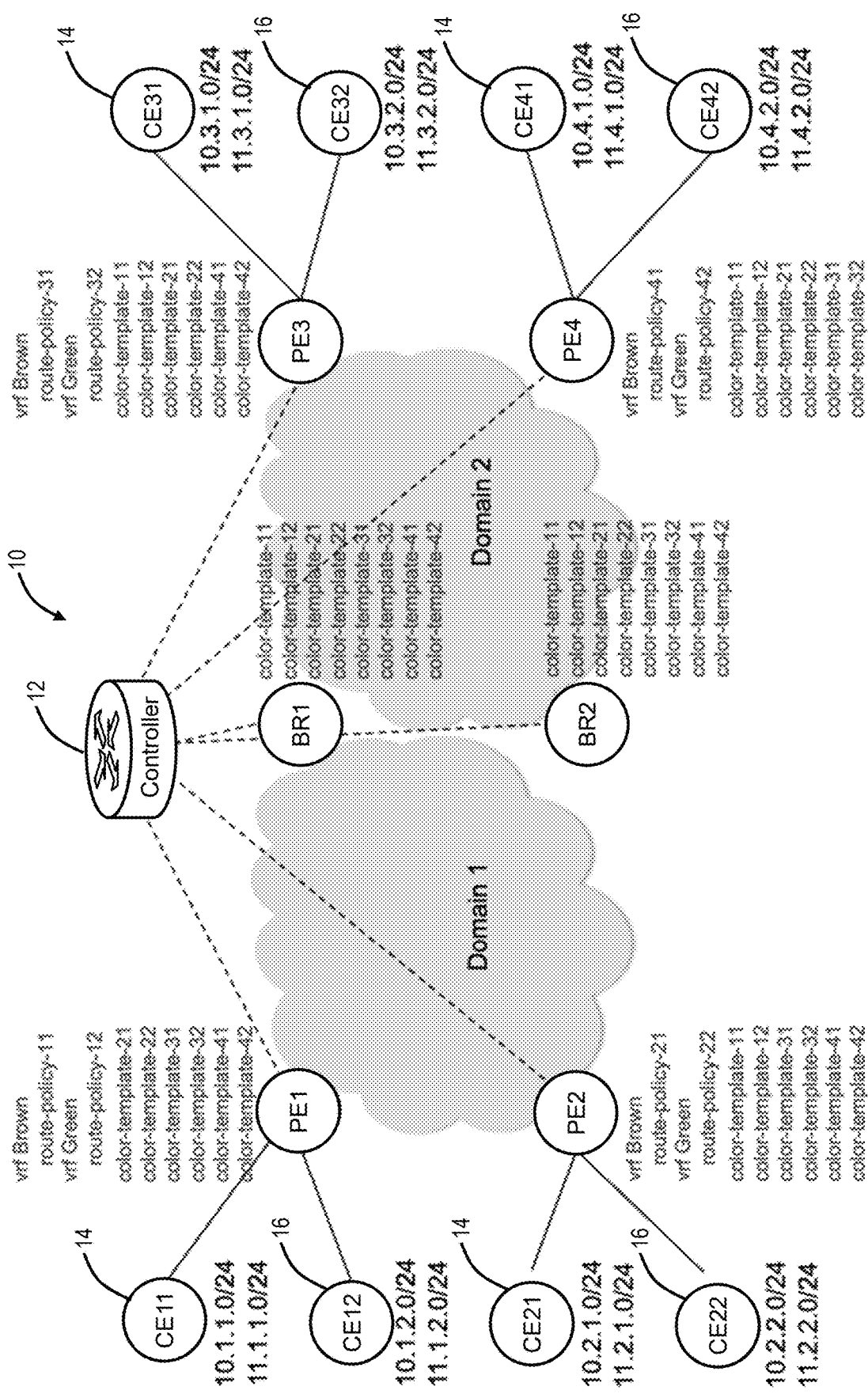
FIG. 1 is a network diagram of a network with a controller and various network elements for illustrating the conventional ANR approach.

FIG. 1 is a network diagram of a network 10 with a controller 12 and various network elements for illustrating the conventional ANR approach. For illustration purposes, the network 10 includes two domains, namely domain 1 and domain 2. The network elements include two Border Routers BR1, BR2 in both the domains 1, 2, Provider Edge Routers PE1, PE2 in the domain 1, and Provider Edge Routers PE3, PE4 in the domain 2. The Border Routers BR1, BR2 can be an Area Border Router (ABR) or an Autonomous System Border Router (ASBR). An ABR is a router that connects one or more OSPF areas to the main backbone network. An ASBR is a router that connects an OSPF network to other autonomous systems (which may use different routing protocols) and distributes external routing information into the OSPF domain. The Border Routers BR1, BR2 and the Provider Edge Routers PE1, PE2, PE3, PE4 each are communicatively coupled to the controller 12. In this example, each Provider Edge Router PE1, PE2, PE3, PE4 has two different VRFs 14, 16, connecting two customers, designated as Customer Edge Routers CE11, CE12, CE21, CE22, CE31, CE32, CE41, CE42. Specifically, the VRF 14 (i.e., VRF Brown) connects the Customer Edge Routers CE11, CE21, CE31, CE41, and the VRF 16 (i.e., VRF Green) connects the Customer Edge Routers CE12, CE22, CE32, CE42.

In this example, route-policy-C applies color value C to the prefixes which match the route-policy. At each Provider Edge Router PE1, PE2, PE3, PE4, two route policies (one per VRF 14, 16 or a customer) have been configured to assign colors to prefixes, such as VPNv4, that are advertised by the Provider Edge Routers PE1, PE2, PE3, PE4 to one another. The set of parameters and constraints needed to instantiate an ANR SR policy for color C is specified in color-template-C. At each Provider Edge Router PE1, PE2, PE3, PE4 and Border Router BR1, BR2, a color-template for each receiving color has to be configured. Thus, each Provider Edge Router PE1, PE2, PE3, PE4 has six color-templates while each Border Routers BR1, BR2 has eight color-templates configured, in this example. See the next section for examples.

This example demonstrates (1) the amount of configurations needed at each Provider Edge Router PE1, PE2, PE3, PE4 and Border Router BR1, BR2, and (2) complexity involved in making any modification to a customer network, due to possible need to make changes to route policies and color-templates configured at Provider Edge Router PE1, PE2, PE3, PE4.

Accordingly, the current ANR approach generally has two disadvantages:

(1) For each color, a color-template must be configured at all Provider Edge Routers PE1, PE2, PE3, PE4 and Border Routers BR1, BR2 (e.g., ASBR's), where the color-template includes parameters and constraints needed to instantiate a SR policy.

(2) At each egress-PE, one or more route policies need to be configured for each customer, to set color for the advertising prefix. If the customer wants to change how the prefixes are colored or to move a service/prefix to a different VPN site, the service providers will have to change the configuration at one or more egress-PE nodes as well.

These two shortcomings reduce flexibility for customers while incurring more operational costs for the service provider.

Also, those skilled in the art will appreciate the network 10 is a simple network for illustration purposes. Practical embodiments can include orders of magnitude more nodes, thus having to configure color-templates on all Provider Edge Routers and route policies for each Customer is complex.

Example Route-Policies and Color-Templates

An example of a route-policy (i.e., called route-policy rmap50) to apply color value 50 to the routes being advertised is provided as follows. This route-policy applies color value 50 to VPNV4 routes that are been advertised by the router where the route policy has been configured.

```
#BGP Routing Policy
routing-policy policies policy 'rmap50'
    statement '10' action permit
    statement '10' set color 50
#Attaching a BGP Routing Policy to a BGP address family so that
BGP routes will have color value 50
bgp instance 65000
    router-id 1.1.1.1
    address-family 'vpnv4' 'unicast'
    peer 2.2.2.2 remote-as 65000 update-source-interface LBK_R1
    peer 2.2.2.2 address-family 'vpnv4' 'unicast' activate true
    peer 2.2.2.2 address-family 'vpnv4' 'unicast' policy 'rmap50'
    'out'
```

The following provides examples for parameters, constraints, a color-template, and intent-templates that are within the color-template:

```
#An intent-template to compute low-latency paths while excluding
links marked with RED and including links marked with BLUE
traffic-engineering intent-templates intent-template
'LOW_LATENCY_1'
    path-metric-type latency
    admin-groups exclude-all RED
    admin-groups include-all BLUE
#An intent-template to compute low-latency paths while including
links marked with GREEN
traffic-engineering intent-templates intent-template
'LOW_LATENCY_2'
    path-metric-type latency
    admin-groups include-all GREEN
    #A color-template for color value 50
traffic-engineering color-templates color-template color 50
    description "For low latency L3VPN"
    source address 1.1.1.1
    candidate-paths candidate-path preference 200
        intent-template LOW_LATENCY_1
    candidate-paths candidate-path preference 100
        intent-template LOW_LATENCY_2
```

This is the color-template for a color value of 50. In the intent-templates, we have used constraints, such as, "admin-groups exclude-all RED". What this means is that the computed TE path should not contain links that have been configured with Admin-group (i.e., affinity) color name RED. If we consider "admin-groups include-all GREEN" constraint, the computed TE path should only include the links that have been configured with Admin-group (i.e., affinity) color name GREEN. RED and GREEN are just labels for some bit-positions of a 32-bit admin-group value. Similar to Admin-groups, Shared Risk Link Group (SRLG) values can also be used in these constraints. The path metric type can be IGP, TE, or latency metric.

Flexible and Scalable ANR

To provide flexibility and scalability, the present disclosure proposes:
  (1) Colors are assigned to prefixes at the Customer Edge Routers CE11, CE12, CE21, CE22, CE31, CE32, CE41, CE42.
  (2) SR policies are generated by the controller using color-templates and provided to Provider Edge Routers and Border Routers.

The first mechanism allows associating colors to prefixes at the CEs, enabling customers to make any change to their network and assign/re-assign color values to prefixes as they wish, without requiring any changes to the service provider network. That is, any change at the CEs does not need to be configured by the service provider at the PEs or BRs.

Figure 2:
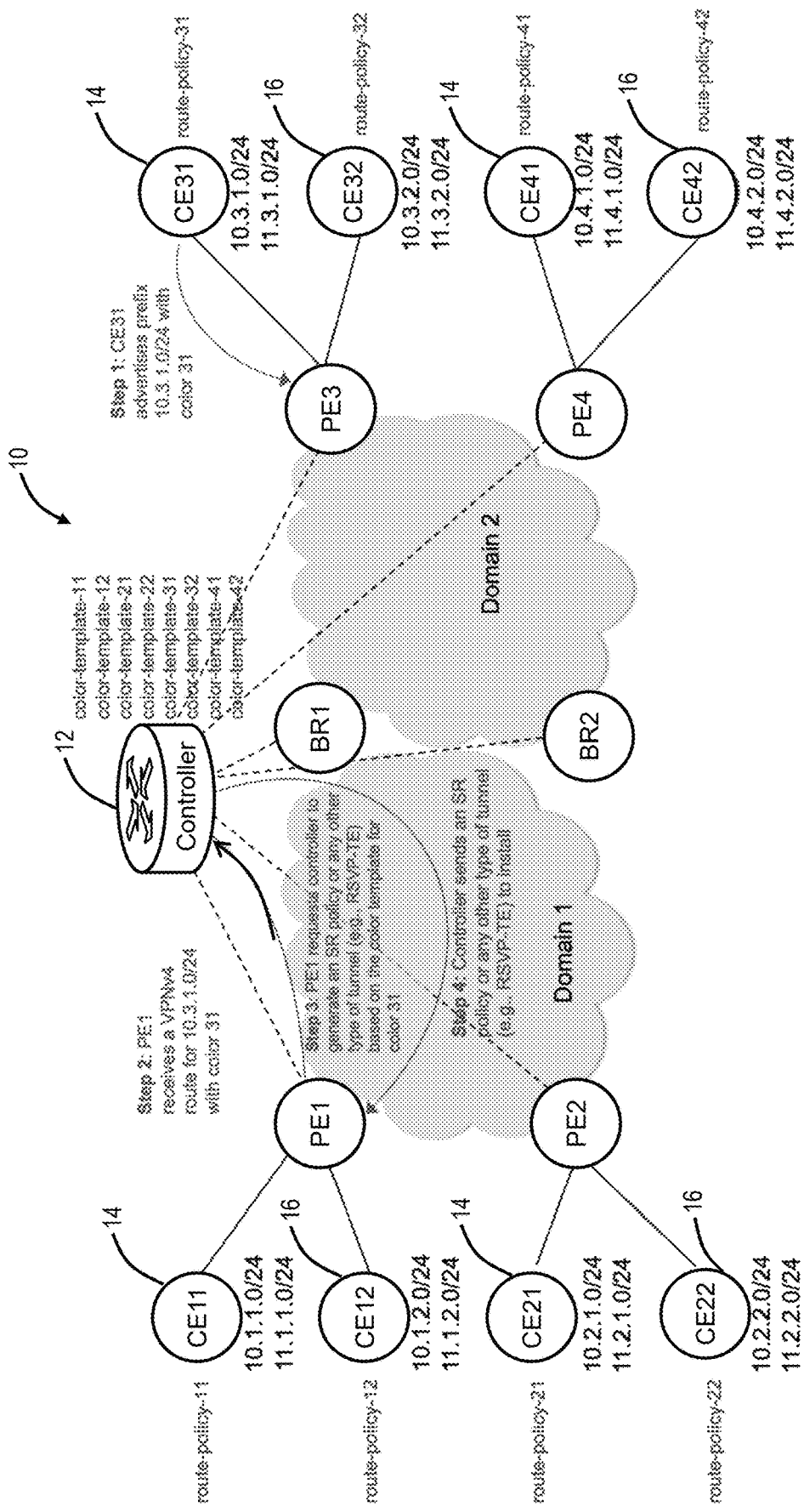
FIG. 2 is a network diagram of the network illustrating flexible and scalable ANR.

FIG. 2 is a network diagram of the network 10 illustrating flexible and scalable ANR. Specifically, the colors are configured at the Customer Edge Routers CE11, CE12, CE21, CE22, CE31, CE32, CE41, CE42, and are assigned to prefixes by using route-policies or other mechanisms. The Customer Edge Routers CE11, CE12, CE21, CE22, CE31, CE32, CE41, CE42 then advertise prefixes with colors to the attached PE (i.e., the attached PE is referred to as an egress-PE). Specifically, the Customer Edge Routers CE11, CE12, CE21, CE22, CE31, CE32, CE41, CE42 advertise the prefixes along with colors to the egress-PE via a routing protocol. In the example of FIG. 2, the Customer Edge Routers CE11, CE12 advertise to the Provider Edge Router PE1, the Customer Edge Routers CE21, CE22 advertise to the Provider Edge Router PE2, the Customer Edge Routers CE31, 32 advertise to the Provider Edge Router PE3, and the Customer Edge Routers CE41, 42 advertise to the Provider Edge Router PE4.

The routing protocol can be IGP (e.g., ISIS, OSPF, etc.) or BGP. The egress-PE can then advertise these routes to other PEs and BRs via BGP. Specifically, IGP (e.g., ISIS, OSPF, etc.) or BGP advertises prefixes (e.g., IPv4 and IPV6) with a color. The BGP process at an egress-PE receives colors from prefixes received in a VRF via IGP or BGP. BGP then advertises BGP updates (e.g., VPNv4, VPNv6, etc.) with the color received via IGP or BGP.

With this mechanism, a customer has freedom to assign colors to their prefixes, from a set of colors provided by the service provider. Colors may be used to differentiate how the service provider provides Quality-of-Service (QOS)/Service Layer Agreement (SLA) in transport over the service provider network. Therefore, this mechanism allows customers to modify their networks without requiring any changes to the service provider network, i.e., at the PEs or BRs.

The second mechanism allows maintaining color-templates only at the controller, enabling the PEs/BRs to request the controller 12 generate SR policies on demand. This reduces required configurations and scales well. Again, color-templates include parameters and constraints required to instantiate SR policies and are maintained at the controller 12 (i.e., the controller 12 maintains color to intent mapping.)

In this mechanism the color-templates are configured only at the controller 12, not at every PE or BR, as in FIG. 1. When an ingress-PE or a BR receives a prefix with color-C, it sends a request to the controller 12 to generate a SR policy based on the color-template-C. This SR policy is then sent back to the ingress-PE or the BR. The request includes the (1) source address of the node (i.e., ingress-PE or BR); (2) destination address of the SR policy (e.g., BGP next-hop); and (3) color-C. The generated SR policy is then sent to the node to be installed. This mechanism significantly reduces the amount of configurations in the service provider network, and simplifies maintenance of the color-templates (i.e., easier to create/modify/delete color-templates configured at only one place).

FIG. 2 illustrates an example of this approach where the color-templates are configured only at the controller 12, and the route-policies are configured at the Customer Edge Routers CE11, CE12, CE21, CE22, CE31, CE32, CE41, CE42 to assign colors to prefixes.

Assuming a VPN service, it shows how the Customer Edge Router CE31 advertises prefix 10.3.1.0/24 with color 31 (step 1), and how the Provider Edge Router PE1 requests the controller 12 to generate an SR policy based on the color-template-31, after the Provider Edge Router PE1 receives a VPNv4 route for 10.3.1.0/24 with color 31 (step 2).

The Provider Edge Router PE1 requests the controller 12 to generate an SR policy or any other type of tunnel (e.g., based on or created by Resource Reservation Protocol-Traffic Engineering (RSVP-TE)) based on the color-template for color 31 (step 3). The controller 12 sends the SR policy or any other type of tunnel information to be installed (step 4). In this example, if the customer were to move prefix 10.3.1.0/24 from CE31 to CE21, they can simply do that without requiring any changes to the service provider network.

As demonstrated in this example, the proposed mechanisms have significantly reduced the required configurations in the service provider network while providing customers with greater flexibility to make any changes to their networks.

Sample TLV Format for CE to Advertise Color in IGP or eBGP

The following table is an example of Type-Length-Value (TLV) format for one of the Customer Edge Routers CE11, CE12, CE21, CE22, CE31, CE32, CE41, CE42 to advertise color in IGP or exterior BGP:

| Type | Length |
|---|---|
| Prefix type (IPv4 or IPv6) | |
| Prefix | |
| Prefix Length | |
| Color | |

Format of the Request Sent to Controller/PCE to Generate a SR Policy

The request sent to the controller 12 by the PE or BR to generate an SR policy will contain following three parameters:

(1) Source address for SR policy (e.g., address of ingress-PE).
(2) Destination address for SR policy (e.g., BGP next hop).
(3) Color (i.e., color received in BGP update).

A sample format of this TLV is shown below:

| Type | Length |
|---|---|
| Source address | |
| Destination address | |
| Color | |

Error Handling at the Controller
  Scenario 1: a color-template has not been configured at the controller for the color in the request to generate a SR policy: When a color-template has not been configured for a specific color, an SR policy for that color can be generated based on a default color-template. If the user configures a color-template for that color later, the already generated SR policy can be modified according to the new color-template. The controller 12 will then push this new SR policy to the ingress-PE.
  Scenario 2: a color-template is deleted: When a color-template is deleted at the controller, the SR policies that were generated based on that color-template can be modified according to the default color-template. The controller will then push the new SR policy to the ingress-PE.
  Scenario 3: a color-template is modified: When a color-template is modified at the controller, the controller 12 can modify the already generated SR policies and push the new SR policies to the ingress-PE.

ANR and On-Demand Next Hop

Again, while ANR is not standardized, some related standards include RFC 9256, Segment Routing Policy Architecture, July 2022, and RFC5512, The BGP Encapsulation Subsequent Address Family Identifier (SAFI) and the BGP Tunnel Encapsulation Attribute, April 2009, the contents of each are incorporate by reference. Further, there is a similar concept referred to as On-Demand Next Hop. Both approaches aim to streamline how networks determine the next hop for traffic routing. In essence, both concepts aim to optimize routing and reduce manual configuration, while emphasizing dynamic, just-in-time calculation of routing paths. While the present disclosure is described with reference to ANR, those skilled in the art will appreciate it can similarly apply to On-Demand Next Hop as well as other similar approaches.

Process

Figure 3:
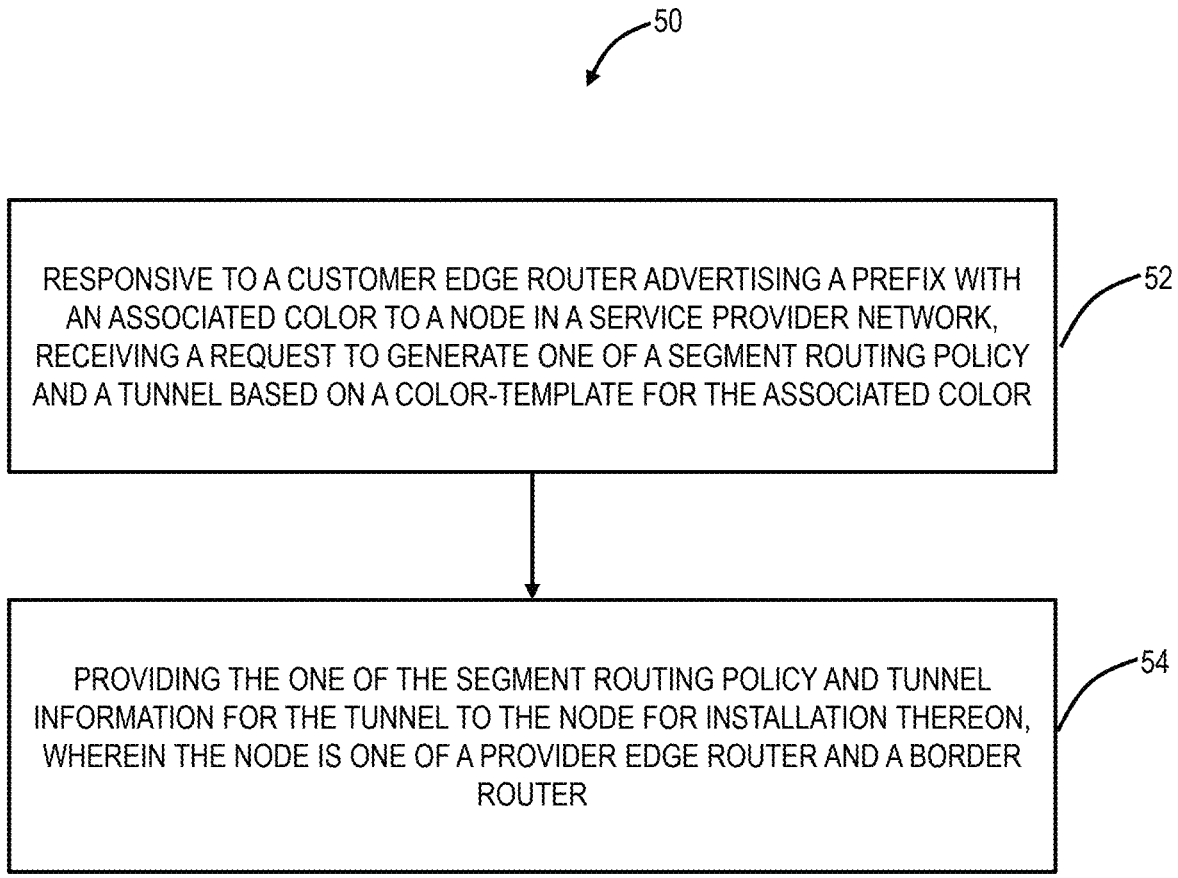
FIG. 3 is a flowchart of a process for flexible and scalable Automatic Next-Hop Resolution (ANR) in Traffic Engineering (TE) networks.

FIG. 3 is a flowchart of a process 50 for flexible and scalable Automatic Next-Hop Resolution (ANR) in Traffic Engineering (TE) networks. The process 50 contemplates implementation as a method having steps, via a controller or other processing device configured to implement the steps, and as a non-transitory computer-readable medium storing instructions that, when executed, cause one or more processors to perform the steps. The steps include, responsive to a Customer Edge Router advertising a prefix with an associated color to a node in a Service Provider Network, receiving a request to generate one of a Segment Routing policy and a tunnel based on a color-template for the associated color (step 52); and providing the one of the Segment Routing policy and tunnel information for the tunnel to the node for installation thereon, wherein the node is one of a Provider Edge Router and a Border Router (step 54).

The color-template can include parameters and constraints needed to provide the one of the Segment Routing policy and the tunnel information. The Customer Edge Router can advertise the prefix with the associated color with one of an Interior Gateway Protocol (IGP) and Border Gateway Protocol (BGP). The tunnel can be based on Resource Reservation Protocol-Traffic Engineering (RSVP-TE).

The steps can further include, responsive to changing the prefix to another associated color at the Customer Edge Router and advertising to the node, receiving another request from the node to generate one of a Segment Routing policy and a tunnel based on another color-template for the another associated color. The request can be via a Type-Length-Value (TLV). The steps can further include, responsive to the color-template not being configured or having been previously deleted, using a default color-template. The steps can further include, responsive to the color-template being modified, pushing a modified one of the Segment Routing policy and tunnel information to the node for installation thereon.

Example Node

Figure 4:
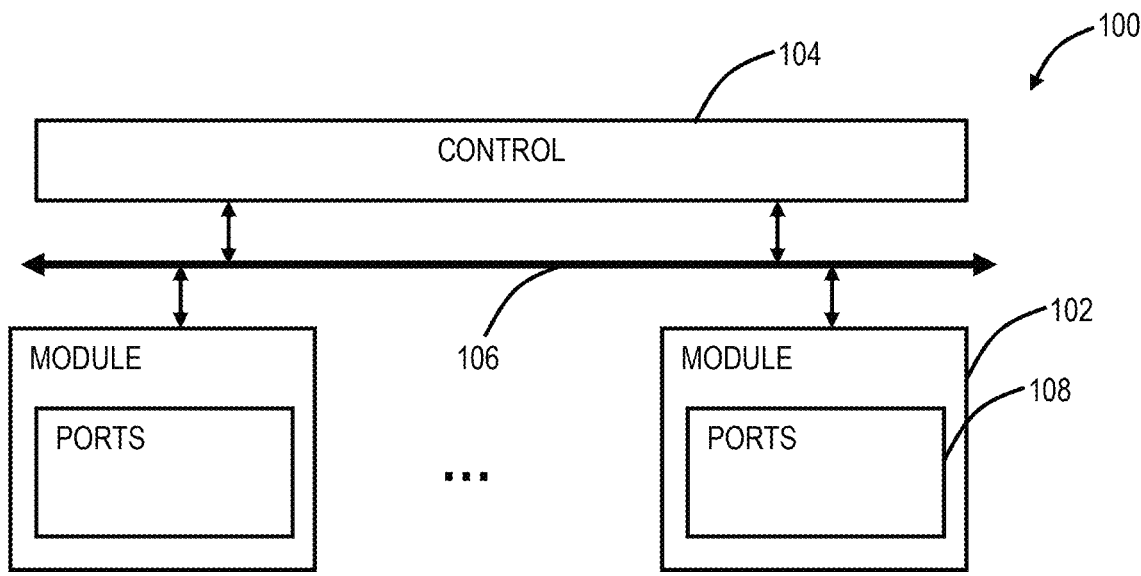
FIG. 4 is a block diagram of an example implementation of a router, such as any of the PE, CE, or BR nodes in FIG. 2.

FIG. 4 is a block diagram of an example implementation of a router 100, such as any of the PE, CE, or BR nodes. Those of ordinary skill in the art will recognize FIG. 9 is a functional diagram in an oversimplified manner, and a practical embodiment may include additional components and suitably configured processing logic to support known or conventional operating features that are not described in detail herein.

In an embodiment, the router 100 can be any network element or other implementations that support Segment Routing networking, include any of the nodes in the network 10. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, the controller 12, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Processing Device

Figure 5:
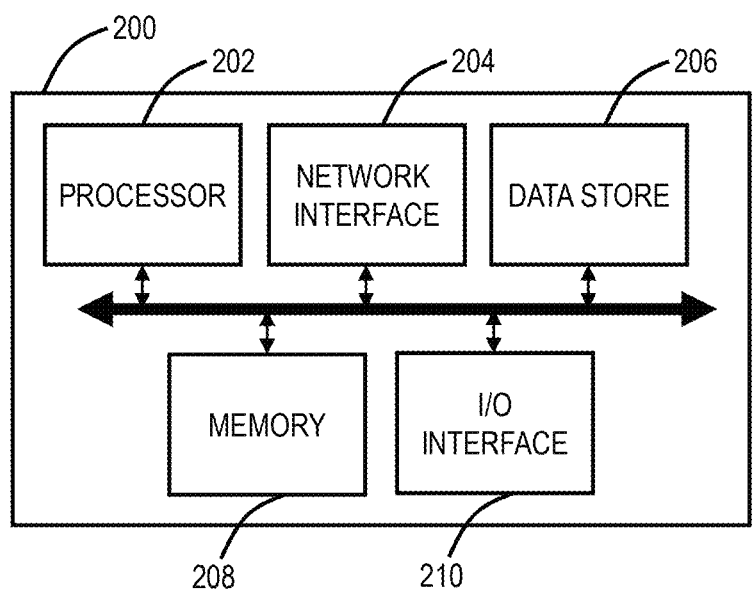
FIG. 5 is a block diagram of an example processing device.

FIG. 5 is a block diagram of an example processing device 200. The processing device 200 can be part of the router 100, or a stand-alone device communicatively coupled to the router 100, such as the controller 12, etc. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any volatile memory elements, e.g., random access memory (RAM, such as DRAM, SRAM, SDRAM, and the like), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any volatile memory elements, e.g., random access memory (RAM, such as DRAM, SRAM, SDRAM, etc.), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A non-transitory computer-readable medium comprising instructions that, when executed at a controller, cause one or more processors to perform steps of:
    responsive to a Customer Edge Router advertising a prefix with an associated color to a node in a Service Provider Network, receiving a request to generate one of a Segment Routing policy and a tunnel based on a color-template for the associated color, wherein the Customer Edge Router advertises the prefix with the associated color with one of an Interior way Protocol (IGP) and Border Gateway Protocol (BGP); and
    providing the one of the Segment Routing policy and tunnel information for the tunnel to the node for installation thereon, wherein the node is one of a Provider Edge Router and a Border Router.

2. The non-transitory computer-readable medium of claim 1, wherein the color-template includes parameters and constraints needed to provide the one of the Segment Routing policy and the tunnel information.

3. The non-transitory computer-readable medium of claim 1, wherein the tunnel is based on Resource Reservation Protocol-Traffic Engineering (RSVP-TE).

4. The non-transitory computer-readable medium of claim 1, wherein the steps further include
    responsive to changing the prefix to another associated color at the Customer Edge Router and advertising to the node, receiving another request from the node to generate one of a Segment Routing policy and a tunnel based on another color-template for the another associated color.

5. The non-transitory computer-readable medium of claim 1, wherein the request is via a Type-Length-Value (TLV).

6. The non-transitory computer-readable medium of claim 1, wherein the steps further include
    responsive to the color-template not being configured or having been previously deleted, using a default color-template.

7. The non-transitory computer-readable medium of claim 1, wherein the steps further include
    responsive to the color-template being modified, pushing the modified one of the Segment Routing policy and the tunnel information to the node for installation thereon.

8. A method comprising steps of:
    responsive to a Customer Edge Router advertising a prefix with an associated color to a node in a Service Provider Network, receiving a request to generate one of a Segment Routing policy and a tunnel based on a color-template for the associated color, wherein the Customer Edge Router advertises the prefix with the associated color with one of an Interior Gateway Protocol (IGP) and Border Gateway Protocol (BGP); and
    providing the one of the Segment Routing policy and tunnel information for the tunnel to the node for installation thereon, wherein the node is one of a Provider Edge Router and a Border Router.

9. The method of claim 8, wherein the tunnel is based on Resource Reservation Protocol-Traffic Engineering (RSVP-TE).

10. The method of claim 8, wherein the steps further include
    responsive to changing the prefix to another associated color at the Customer Edge Router and advertising to the node, receiving another request from the node to generate one of a Segment Routing policy and a tunnel based on another color-template for the another associated color.

11. The method of claim 8, wherein the request is via a Type-Length-Value (TLV).

12. The method of claim 8, wherein the steps further include
    responsive to the color-template not being configured or having been previously deleted at a controller, using a default color-template.

13. The method of claim 8, wherein the steps further include
    responsive to the color-template being modified at a controller, pushing the modified one of the Segment Routing policy and the tunnel information to the node for installation thereon.

14. A method comprising steps of:
    responsive to a Customer Edge Router advertising a prefix with an associated color to a node in a Service Provider Network, receiving a request to generate one of a Segment Routing policy and a tunnel based on a color-template for the associated color, wherein the color-template includes parameters and constraints needed to provide the one of the Segment Routing policy and the tunnel information; and providing the one of the Segment Routing policy and tunnel information for the tunnel to the node for installation thereon, wherein the node is one of a Provider Edge Router and a Border Router.

15. The method of claim 14, wherein the tunnel is based on Resource Reservation Protocol-Traffic Engineering (RSVP-TE).

16. The method of claim 14, wherein the steps further include responsive to changing the prefix to another associated color at the Customer Edge Router and advertising to the node, receiving another request from the node to generate one of a Segment Routing policy and a tunnel based on another color-template for the another associated color.

17. The method of claim 14, wherein the request is via a Type-Length-Value (TLV).

18. The method of claim 14, wherein the steps further include responsive to the color-template not being configured or having been previously deleted at a controller, using a default color-template.

19. The method of claim 14, wherein the steps further include responsive to the color-template being modified at a controller, pushing the modified one of the Segment Routing policy and the tunnel information to the node for installation thereon.

\* \* \* \* \*